United States Patent [19]
Althaus et al.

[11] Patent Number: 5,070,613
[45] Date of Patent: Dec. 10, 1991

[54] RAZOR HEAD, ESPECIALLY RAZOR BLADE UNIT OF A WET SAFETY RAZOR

[75] Inventors: Wolfgang Althaus, Wuppertal, Fed. Rep. of Germany; Dave Coffin, Norwich, United Kingdom

[73] Assignee: Wilkinson Sword Gesellschaft mit beschränkter Haftung, Solingen, Fed. Rep. of Germany

[21] Appl. No.: 568,263

[22] Filed: Aug. 15, 1990

[30] Foreign Application Priority Data

Aug. 16, 1989 [DE] Fed. Rep. of Germany ....... 3926899

[51] Int. Cl.$^5$ .............................................. B26B 21/00
[52] U.S. Cl. ........................................... 30/50; 30/32
[58] Field of Search .......................... 30/32, 41, 47–50

[56] References Cited

FOREIGN PATENT DOCUMENTS

| | | |
|---|---|---|
| 2447087 | 4/1975 | Fed. Rep. of Germany . |
| 2701271 | 7/1977 | Fed. Rep. of Germany .......... 30/50 |
| 2750796 | 5/1978 | Fed. Rep. of Germany . |
| 1587317 | 4/1978 | United Kingdom . |
| 2087287 | 9/1981 | United Kingdom . |
| 2166997 | 5/1986 | United Kingdom . |

*Primary Examiner*—Douglas D. Watts
*Attorney, Agent, or Firm*—Robert W. Becker & Associates

[57] ABSTRACT

A razor head, especially in the form of a so-called razor blade unit, is disposed on the front end of a handle. A single or double razor blade rests in a fixed manner on a blade holder of a plastic housing. The razor blade or blades are fixedly secured on a spacer and form a blade holder that can essentially be inserted from above into the plastic housing onto the blade platform thereof. After insertion, the blade holder can be fixed in the plastic housing. For this purpose, either a fixation strip is placed upon the blade holder, or the plastic housing is plastically deformable in such a way that the blade holder is fixed in the plastic housing.

27 Claims, 10 Drawing Sheets

RAZOR HEAD, ESPECIALLY RAZOR BLADE UNIT OF A WET SAFETY RAZOR

BACKGROUND OF THE INVENTION

The present invention relates to a razor head, especially a razor blade unit of a wet safety razor, with the razor head being disposed at the front end of a handle and including a plastic housing that has a front guide strip, and with a razor blade means in the form of a single or double razor blade resting in a fixed manner on a blade platform of the housing, whereby if the razor blade means is a double razor blade, a spacer is disposed between the two razor blades.

With disposable wet safety razors, a single or double razor blade is fixedly embedded in the razor head in a plastic housing. If the razor head is a separate component and can be secured to a handle, for which purpose the handle as well as the razor head are provided with cooperating locking mechanisms, the razor head is known as a so-called razor blade unit.

A razor head in the form of a razor blade unit of the aforementioned general type is known from GB-PS 2 087 287. This known razor blade unit has a one-piece plastic housing in which is fixedly secured either a single or double razor blade, which rests upon a blade platform of the plastic housing. If a double razor blade is used, a spacer is disposed between the two razor blades, which merely rest upon the spacer and are not fixedly connected therewith. This has the drawback that during shaving the razor blades wobble and hence adversely affect the shaving characteristics of the razor. To secure the razor blades, which rest against both sides of the spacer, within the plastic housing, fingers are formed onto the housing and extend towards the front, with these fingers at the same time forming a cover and together with the front guide strip of the razor blade unit defining the razor geometry. To effect securement, the unit comprised of the razor blades as well as the spacer is pushed from the front between the blade platform and the upper fingers, which press from above onto the razor blades as well as the spacer and thus fix the same within the plastic housing. Furthermore, projections are provided in the side walls of the plastic housing, with lateral recesses of the spacer catching in these projections when the unit is inserted The single blade is secured within the plastic housing in a manner similar to the securement of the double blade by again clamping the razor blade in place between the upper fingers and the lower blade platform.

With this heretofore known razor blade unit, the securement of the razor blade or blades within the plastic housing is complicated and expensive. On the one hand, when double razor blades are used, they can very easily slide on the spacer. On the other hand, the insertion of the unit comprised of the razor blades and the spacer disposed therebetween requires much skill. Furthermore, during the insertion process it is very easy for the cutting edges of the razor blades to become damaged.

Proceeding from a razor head of the aforementioned general type, it is an object of the present invention to improve such a razor head in such a way that the razor blade or blades can be secured within the plastic housing in a simpler manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The razor head of the present invention is characterized primarily in that the razor blade or blades are fixedly secured to a spacer to form a blade holding unit therewith that is essentially insertable from above into the plastic housing and onto the blade platform with the blade holding unit being fixable in t he plastic housing after being placed therein.

A razor head that is constructed pursuant to the present invention has the advantage that it is possible in a very simple manner to secure the razor blade or blades within the plastic housing. In this connection, the razor head comprises straightforward components. To begin with, with the use of a double razor blade, the two razor blades are fixedly secured on both sides of the spacer, which for this purpose can, for example, have a flat parallelepipedal configuration, although the spacer can also be in the form of an L-shaped strip, as will be described in detail subsequently in conjunction with one advantageous specific embodiment of the present invention Similarly, with the use of a single razor blade, this blade is fixedly secured on one side of the spacer. In this way, a so-called blade holding unit or blade holder is formed that can be handled very easily with no difficulty. In particular, the fixed securement is ensured, so that the razor blades can no longer slide on the spacer. Furthermore, due to the fixed securement of the razor blades on the spacer, the razor blades cannot wobble during shaving, thus improving the overall shaving characteristics. The thus-formed blade holder can then very easily be inserted from above into the lower portion of the plastic housing without this movement being obstructed by a part of the plastic housing. Subsequently, the final fixation of the blade holder within the plastic housing is effected. To ensure a satisfactory seating of the blade holder within the plastic housing, the inner cavity of the plastic housing conforms exactly to the outer contour of the blade holder.

The razor blade or blades are preferably secured to the spacer by being welded or glued thereto. This welding or gluing is preferably carried out over the entire contact surface between the razor blade or blades and the spacer. In this way, an optimum large-surface connection is produced. Where welding is used, the spacer is made of metal, whereas where gluing is used, the spacer can be made of plastic.

Pursuant to one improved specific embodiment of the present invention, a strip having an essentially L-shaped cross-sectional profile is provided, one leg of which defines the spacer, while the other leg is received by a corresponding longitudinal slot in the lower portion of the plastic housing. Such an L-shaped strip ensures an extremely stable blade holder that in addition can be mounted very reliably within the plastic housing, especially in the lower portion thereof Above all, the angled spacer has the advantage that razor blades having narrow cutting edges can thereby be produced.

The two legs of the L-shaped strip are preferably disposed perpendicular to one another Pursuant to one preferred specific embodiment, the strip is formed from short strip elements that are ridgedly interconnected by pieces in the vicinity of the legs thereof that are received by longitudinal slots in the lower portion of the plastic housing. Perpendicular to the cutting edge or edges of the razor blade or blades, and in alignment with the openings that are left between the strip elements, the back side of the plastic housing is correspondingly open The strip elements are integral with the pieces that are disposed therebetween, so that on the whole a one-piece strip is obtained that is quite stable due to the angled configuration. With a double razor blade, one leg of this strip forms the spacer for the razor blades, with the two razor blades being disposed on both sides of the spacer, thereby fixing the position of the spacer between the two razor blades. Since openings are left free between the two razor blades due to the gaps between the strip elements, during shaving a build-up of shaving cream within the plastic housing is avoided since the shaving cream can more easily flow through and away. This also improves and simplifies cleaning of the razor head. None the less, despite the openings in the strip the angled configuration of the strip makes it adequately stable and rigid None the less, despite the angled configuration of the spacer, no more material is needed then with a conventional nonangled spacer.

Pursuant to a further specific embodiment of the present invention, openings are left free above the pieces in the region of the legs that are interconnected by the pieces This increases the cross-sectional passage area in that with a double razor blade, the strip has openings not only between the razor blades but also below the lower razor blade.

The strip elements are preferably connected with one another in essentially the central portion of the leg, with the lower portion of the plastic housing having apertures for receiving the free ends of the legs that are interconnected by the pieces. In this way, not only is an optimum flowthrough area obtained, but the blade holder can be mounted within the lower portion of the plastic housing in a simple and reliable manner, with the apertures defining the longitudinal slot for receiving the one leg of the blade holder.

Pursuant to a further specific embodiment of the present invention, the blade platform is formed by support ribs that extend perpendicular to the cutting edge or edges of the razor blade or blades In this connection, these support ribs are preferably disposed in front of the short strip elements of the strip of the blade holder. In this way, only little material is necessary for the lower portion of the plastic housing since the blade holder is not continuously supported by the blade platform over its entire length.

In order to further increase the flow-through area, and to furthermore improve the ability to clean the razor head, the lower portion of the plastic housing can be provided with openings between the support ribs.

To further optimize the flow characteristics within the plastic housing, the guide strip, starting from its upper side, is angled off downwardly and toward the rear.

In order to avoid difficult-to-clean gaps in the region of the cutting edge or edges of the razor blade or blades, as well as to enable a better flowing-away of the shaving cream, the support ribs are provided with recessed portions on the top in the region behind the guide strip.

In one preferred embodiment, the guide strip is integrally formed with the lower portion of the plastic housing.

Pursuant to a first structural arrangement for fixing the blade holder within the plastic housing, it is proposed that the blade holder be insertable onto the blade platform into a lower portion of the plastic housing that is provided with the blade platform, and that a fixation strip that defines a protective cap be placeable upon the lower portion of the plastic housing, with the blade holder being disposed and fixed therebetween; the fixation strip is fixedly connectable to the lower portion of the plastic housing. Thus, the razor head comprises three straightforward components, namely the lower portion, an upper portion in the form of the fixation strip, as well as the blade holder These three components are easy to assemble, with the blade holder first being placed from above onto the lower portion Subsequently, the final fixation of the blade holder is effected by placing the upper fixation strip thereupon and fixedly connecting this fixation strip with the lower portion of the plastic housing All of this can be carried out rapidly and without difficulty, whereby above all an exact position of the blade holder, and hence of the razor blades within the plastic housing, is insured.

Pursuant to a further specific embodiment of the present invention, the upper fixation strip is provided with lateral wings or side pieces via which the fixation strip is secured to a side wall of the lower portion of the plastic housing. This provides a very stable connection between the upper fixation strip and the lower portion of the plastic housing. The connection in this lateral region of the plastic housing is also realized in a technically straightforward manner.

Pursuant to a further specific embodiment of the present invention, the fixation strip can have a rear wall via which the fixation strip is secured to a rear wall of the lower portion of the plastic housing. Here also a technically easy to produce connection is provided between the upper fixation strip and the lower portion of the plastic housing.

To connect the lower portion of the plastic housing with the fixation strip, these two components can be glued together, welded together, especially via ultrasonic welding, or can be inserted into one another. To insert the two components into one another, these components can have corresponding pins and bores that are frictionally connected when the components are inserted into one another.

To further improve the shaving characteristics of the razor head, the fixation strip that defines the protective cap is preferably coated with a friction-reducing coating, especially of photolacquer or a polymer.

The fixation strip preferably has a rear wall that is provided with openings that are aligned with the openings in the strip of the blade holder In this way, the upper fixation strip extends about the blade holder not only from above but also from the rear, without thereby obstructing flow through Pursuant to an alternative embodiment of the present invention for fixing the blade holder in the plastic housing, it is proposed that after the blade holder has been inserted, the plastic housing be plastically deformable in such a way that the blade holder is fixed in position between the deformed portion and the blade platform With this embodiment, the razor head comprises only two parts, namely the plastic housing and the blade holder. After the blade holder has been placed into the plastic housing, the final fixation of the blade holder is effected by a suitable plastic deformation of the plastic housing, so that the blade holder is fixed in a reliable manner in its position Such a fixation in the form of a plastic deformation can be carried out in a technically straightforward manner.

In order to keep the expense and effort for the plastic deformation of the plastic housing very low, it is proposed that the plastic housing be cold deformable or shapeable.

Pursuant to a further specific embodiment of the blade holder, it is proposed that the spacer project beyond the ends of the razor blade or blades, with the blade holder being adapted to be secured in position in the region of these free ends of the spacer. This has the advantage that the securement of the blade holder can be effected beyond the effective region of the cutting edges of the razor blades, so that the shaving characteristics of the razor head are in this way not adversely affected.

Pursuant to one preferred specific embodiment, each of the two side walls of the plastic housing is provided with a recessed area that is open toward the top; the ends of the blade holder can be inserted from above into these recessed areas. In the region of these recessed areas, the side walls are bent inwardly over the ends of the blade holder to fix the same in position within the plastic housing. This represents a technically very straightforward possibility for fixing the blade holder within the plastic housing, with the fixation of the ends of the blade holder within the recessed areas ensuring a great precision with regard to the positioning.

With this preferred embodiment, the recessed areas preferably have a funnel-shaped configuration. In addition, the back side of each of the recessed areas can also have formed thereon a rib or fin that extends in the direction of insertion and also narrows the recessed areas in this direction of insertion This has the advantage that during insertion of the blade holder into the recessed areas, the blade holder is pressed toward the front, so that the blade holder rests completely against the front side of the recessed areas, whereby the aforementioned razor geometry is achieved in an optimum manner without variations resulting during the process of manufacturing the razor head.

It is furthermore proposed with the present invention that an essentially vertically upwardly extending strip be formed on the rear longitudinal side of the plastic housing This strip assumes the function of the protective cap of known razor heads, and together with the front guide strip, as well as the razor blades, defines the razor geometry.

Pursuant to an alternative embodiment for fixing the position of the blade holder within the plastic housing, it is finally proposed that on the rear longitudinal side of the plastic housing there be formed an essentially vertically upwardly extending strip that for fixing the position of the blade holder within the plastic housing is bent toward the front either over its entire length or over portions of the length thereof Also with this type of securement each of the side walls of the plastic housing is preferably provided with an upwardly open recessed area into which the ends of the blade holder can be inserted from above prior to bending the rear strip toward the front In this way, the blade holder is very reliably fixed in position within the plastic housing The final fixation is then effected by bending the rear strip toward the front, whereby this can be effected over the entire length of the strip.

However, as an alternative it is also possible to bend only portions of the length of this rear strip toward the front. Especially when the rear strip is bent toward the front over its entire length, this strip assumes the function of the protective cap of heretofore known razor heads and together with the front guide strip, as well as the razor blades, defines the razor geometry.

Further specific features of the present invention will described in detail subsequently.

DESCRIPTION OF THE PREFERRED EMBODIMENTS

Referring now to the drawings in detail, FIGS. 1 to 9 illustrate a first exemplary embodiment of the inventive razor blade unit, while FIGS. 10 to 17 illustrate a second exemplary embodiment of the inventive razor blade unit.

Figure 1:
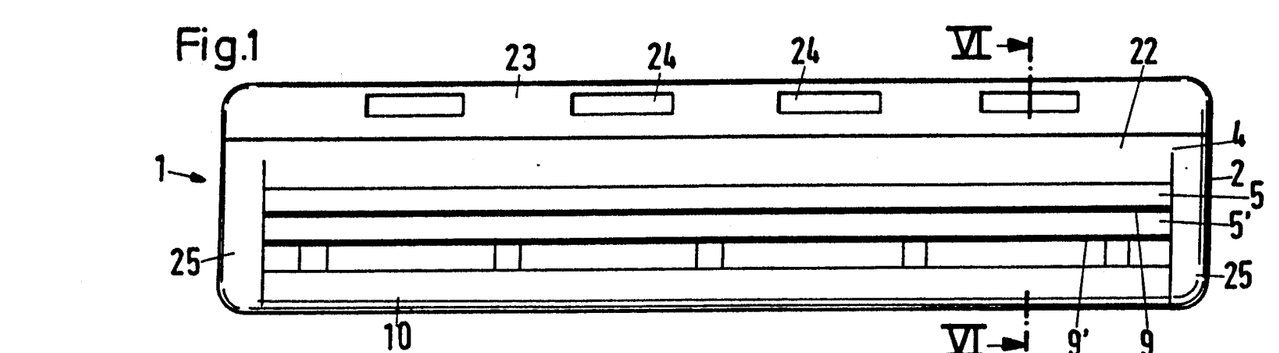
FIG. 1 is a top view of a first exemplary embodiment of an inventive razor blade unit.
Figure 2:
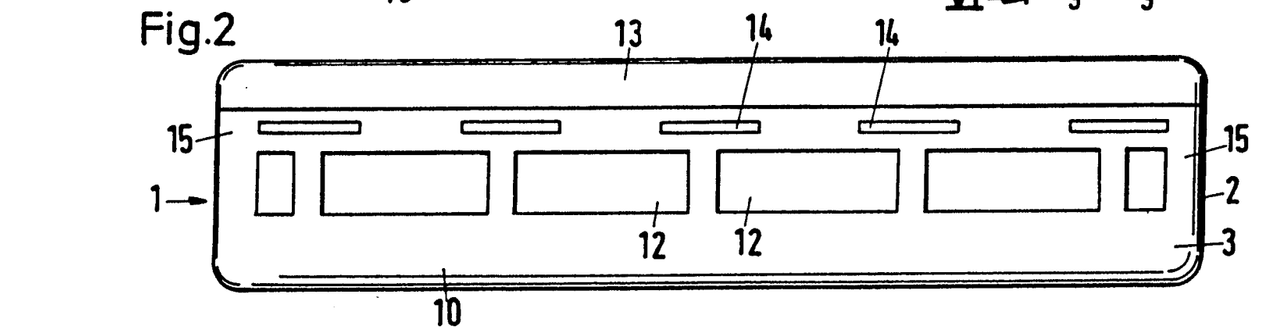
FIG. 2 is a bottom view of the razor blade unit of FIG. 1.
Figure 3:
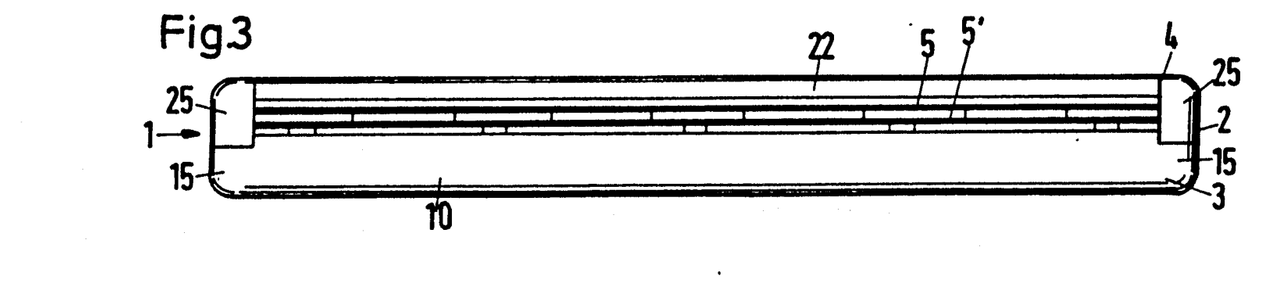
FIG. 3 is a front view of the razor blade unit of FIG. 1.
Figures 4, 5, 6:
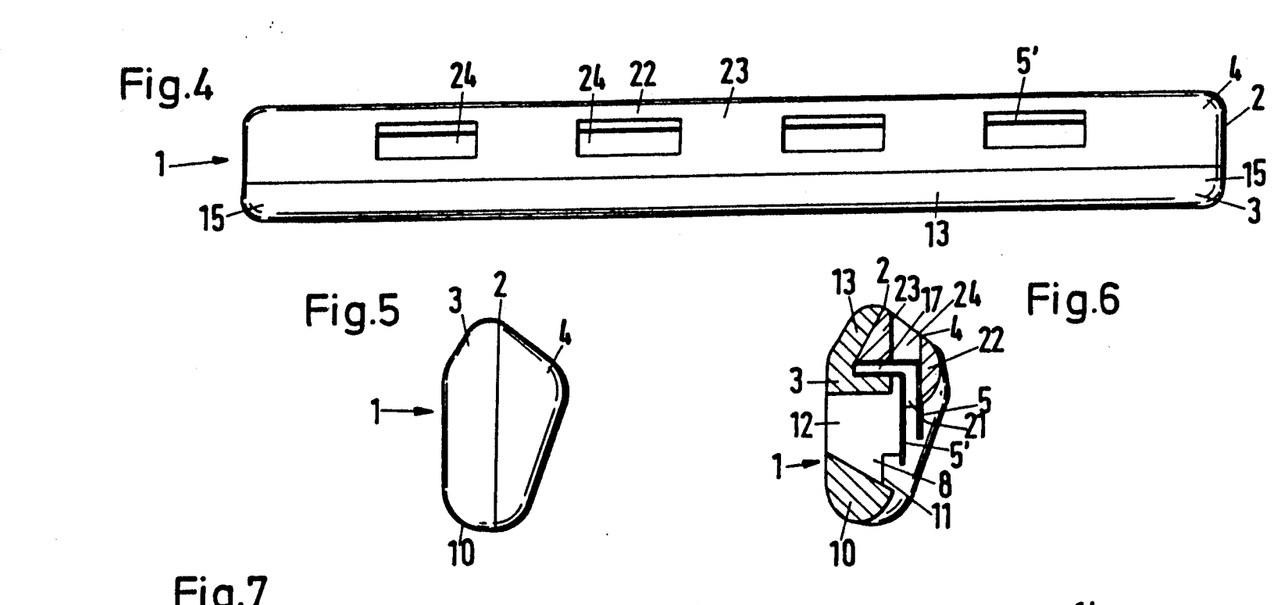
FIG. 4 is a rear view of the razor blade unit of FIG. 1.
FIG. 5 is a side view of the razor blade unit of FIG. 1.
FIG. 6 is a cross-sectional view taken along the line VI—VI in FIG. 1.

In the first embodiment, the razor blade unit 1 comprises a plastic housing 2. This housing, in turn, comprises a lower portion 3 as well as an upper fixation strip 4, with these two components being fixedly interconnected and between them firmly and securely holding in place a blade holder 6 that carries the razor blades 5, 5'. In this connection, the fixation strip 4 can be glued to the lower portion 3, can be fused thereto, in particular via ultrasonic fusion, or the two parts can be frictionally interconnected via pins and holes.

The lower portion 3 of the plastic housing 2 has a centrally disposed central crosspiece 7 that also extends in the longitudinal direction. Formed on this central crosspiece 7 are support ribs 8 that are spaced over the length thereof and which extend perpendicular to the longitudinal direction of the cutting edges 9, 9' of the two razor blades 5, 5'. At their front, free ends, these support ribs 8 carry a guide strip 10, the front surface of which is rounded off. In the region behind the guide strip 10, each of the support ribs 8 is provided with a respective recessed portion 11. In the regions between adjacent support ribs 8, as well as between the central crosspiece 7 and the guide strip 10, respective openings 10 are defined, as can be seen in particular in the plan view of FIG. 7 as well as in the bottom view of the entire razor blade unit 1 in FIG. 2.

Figure 7:
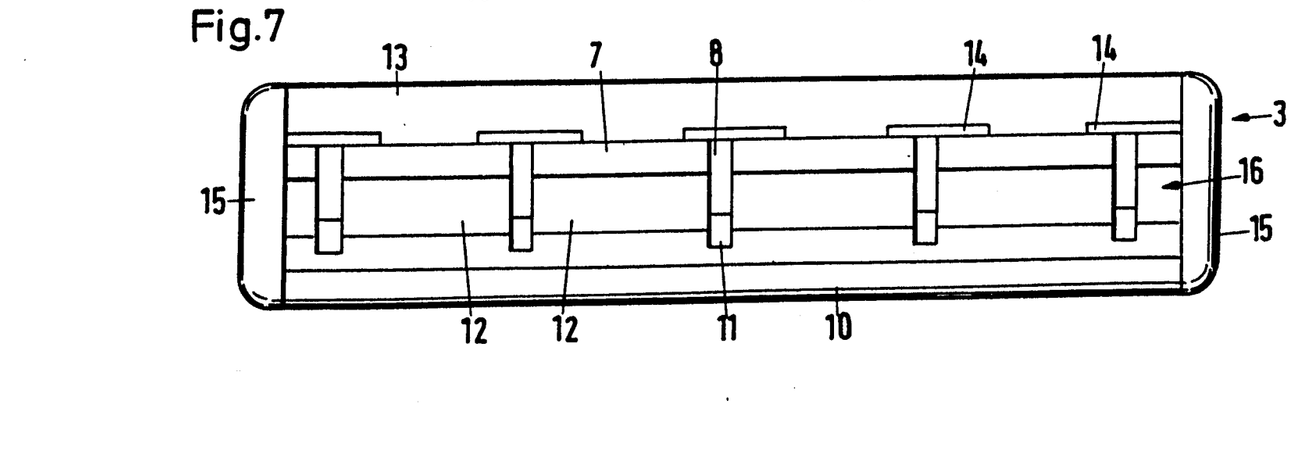
FIG. 7 is a top view of the lower portion of the plastic housing of the razor blade unit of FIG. 1.

On that side remote from the guide strip 10, the central crosspiece 7 is provided with a rear wall 13 that extends parallel thereto. This rear wall 13 extends at an angle downwardly toward the central crosspiece 7 In so doing, in the region between the central crosspiece 7 and the rear wall 13 openings in the form of longitudinal slots 14 are formed that serve to receive the blade holder 6, as will be described subsequently Finally, the lower portion 3 of the plastic housing 2 also has side walls 15.

The support ribs 8 of the lower portion 3 of the plastic housing 2 form a blade platform 16 for the support of the blade holder 6. This blade holder comprises a strip 17, which has an essentially L-shaped cross-sectional configuration The strip 17, in turn, comprises individual, short strip elements 17' that are interconnected by pieces 18, and in particular in the region of the one leg 19 of the strip 17, i.e. the leg 19' of the strip elements 17'. The pieces 18 are integral with the strip elements 17', and are essentially disposed in the central portion of the legs 19' of the strip elements 17', so that above each piece 18 a respective opening 20 is left, while the legs 19' have a free end. The other leg 19a of the strip 17, i e. the legs 19a' of the strip elements 17', serve for the accommodation and securement of the two razor blades 5, 5'. In this connection, the upper razor blade 5 is secured to one side of the leg 19a, and the lower razor blade 5' is secured to the opposite side of the leg 19a, so that this leg 19a fulfills the function of a spacer 21. The two razor blades 5, 5' are thus oriented parallel to one another, with the cutting edges 9, 9' being offset relative to one another. As can be seen in the front view of the blade holder 6 in FIG. 9, and actually also in the front view of the complete razor blade unit 1 in FIG. 3, openings 20 are left between the legs 19a'.

To assemble the razor blade unit 1, the thus designed blade holder 6 is placed upon the lower portion 3 from above in such a way that the underside of the lower razor blade 5' comes to rest upon the blade platform 16 that is defined by the support ribs 8. Furthermore, the free ends of the legs 19' of the strip elements 17' are received in the corresponding longitudinal slots 14 in the lower portion 3. The blade holder 6 is thus securely held in position upon or in the lower portion 3 of the plastic housing 2.

Figure 8:
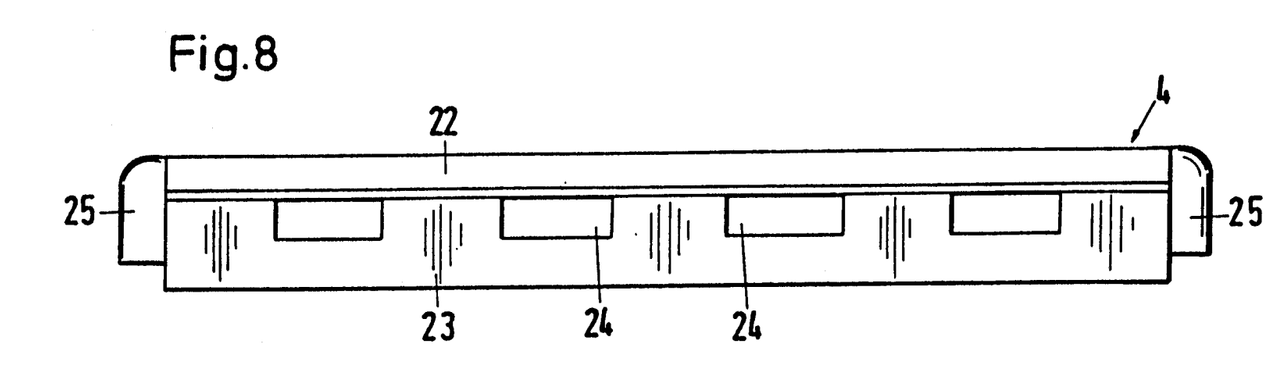
FIG. 8 is a front view of the upper portion, in the form of a fixation strip, of the plastic housing of the razor blade unit of FIG. 1.
Figure 9:
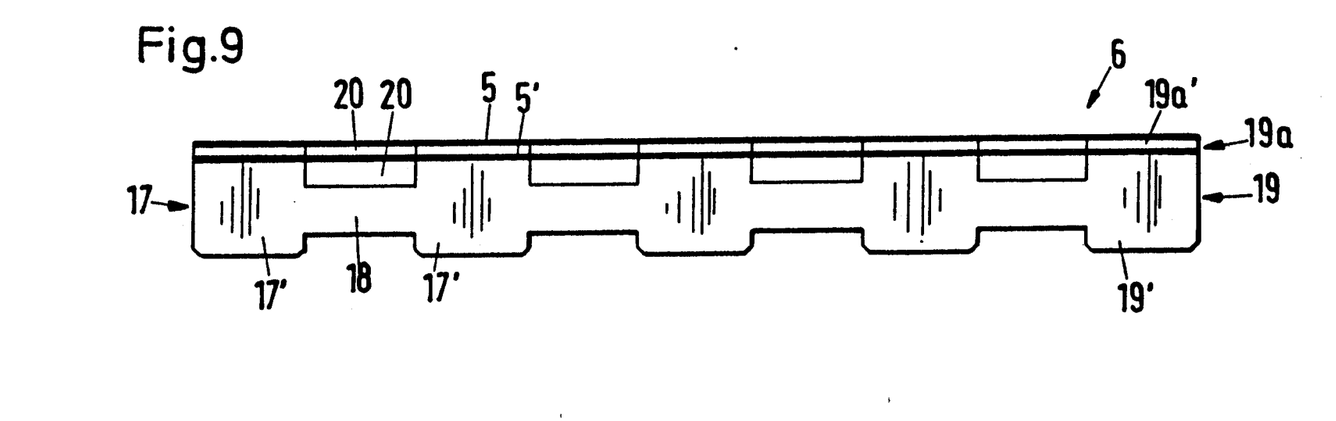
FIG. 9 is a front view of the blade holder.

The fixation strip 4 serves for the fixation of the blade holder 6. The fixation strip 4 defines a protective cap 22 that rests upon the upper side of the upper razor blade 5. A rear wall is formed on this protective cap 22 The rear wall 23 is provided with openings 24 that are aligned with the openings 20 that are formed in the strip 17. Additionally formed on the sides of the fixation strip 4 are wings or side pieces 25.

To form the complete razor blade unit 1, the fixation strip 4 is placed upon the lower portion 3 from above. In so doing, the rear wall 23 of the fixation strip 4 comes to rest flushly upon the rear wall 13 of the lower portion 3, and the underside of the side pieces 25 of the fixation strip 4 come to rest flushly upon the side walls 15 of the lower portion 3 The fixed connection between the fixation strip 4 and the lower portion can be effected via adhesion, fusion (in particular ultrasonic fusion), or via a frictional connection The protective cap 22 that is defined by the fixation strip 4 can additionally be provided with a friction-reducing coating, for example of photolacquer or a polymer.

The angled strip 17 for the spacer 21 with the openings 20 for flow-through channels permits the manufacture of a blade having thin cutting edges. The openings 20 together with the openings 24 in the fixation strip, as well as the openings 12 in the lower portion 3, ensure a better flow-through as well as an improved and simpler cleaning The shape of the strip 17 is thus such that on the whole no greater use of material results than with non-angular spacers. This is essentially achieved due to the fact that the strip 17 has the shape of interlocking rakes. The particular advantage of this design is that despite the openings 20 between the razor blades 5, 5', the strip 17, and hence the spacer 21 due to the angled shape, form a stable unit with the razor blades 5, 5'. In addition, the inventive razor blade unit has the advantage of the additional blade cover in the form of a protective cap 22, which is formed by the fixation strip 4.

Figure 10:
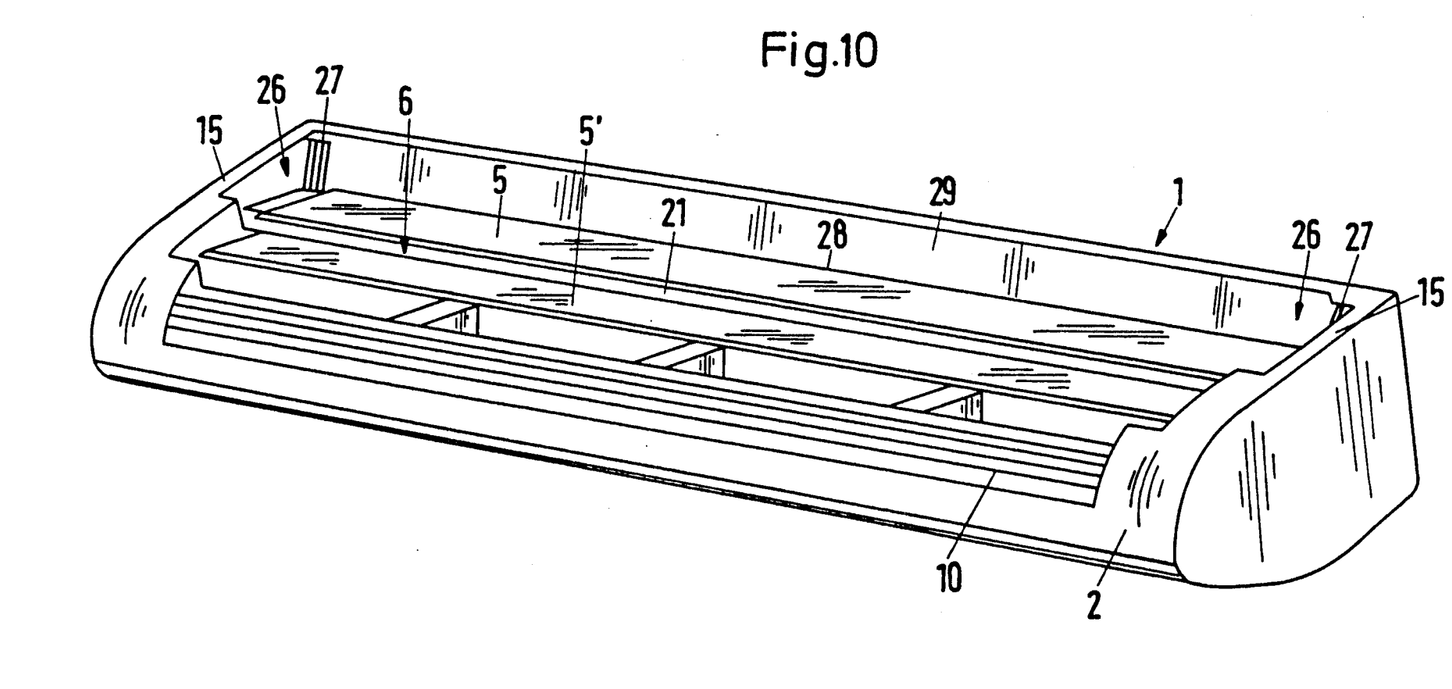
FIG. 10 is a view of a second exemplary embodiment of an inventive razor blade unit.
Figure 11:
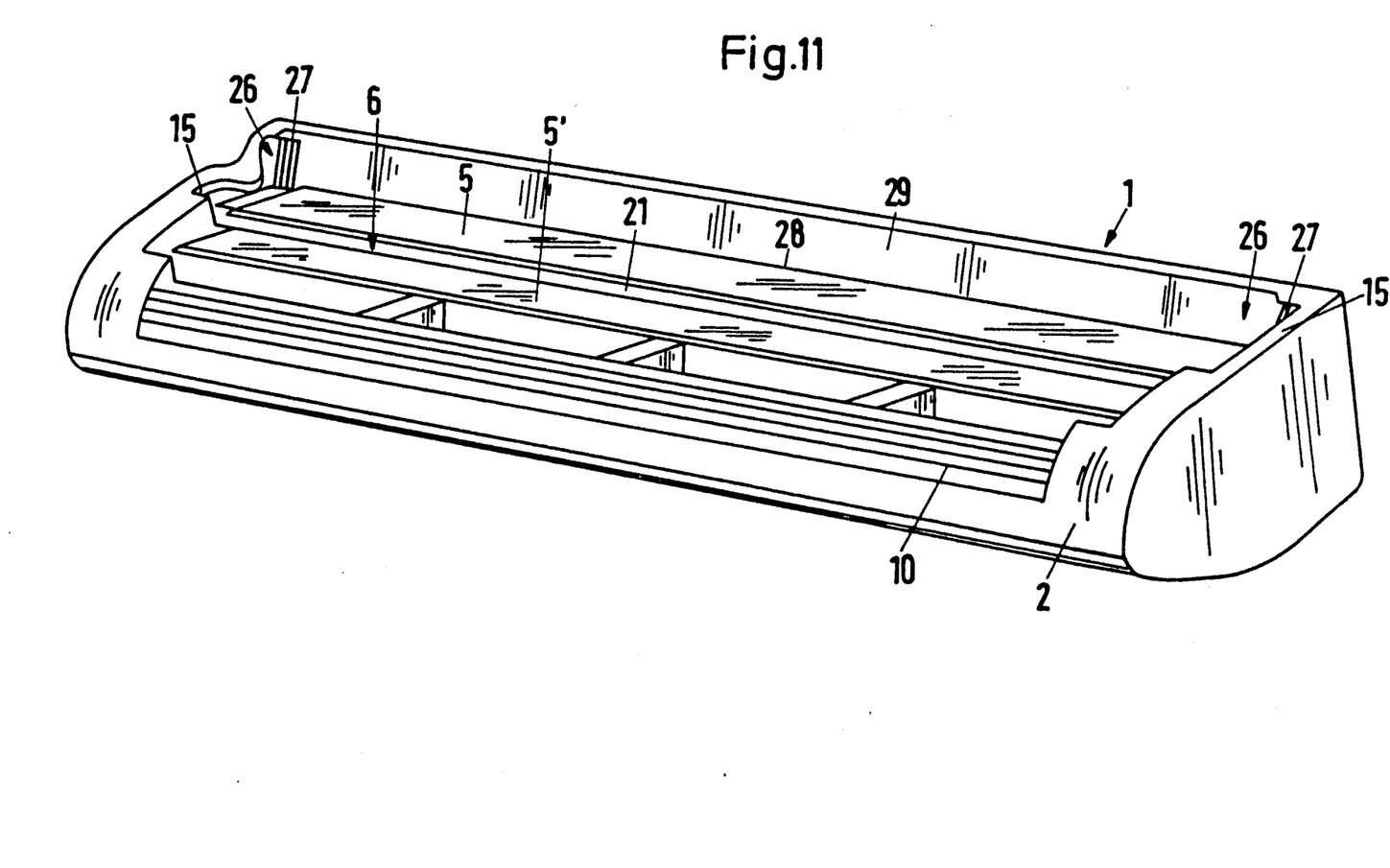
FIG. 11 is a view of the razor blade unit similar to that of FIG. 10, but prior to the plastic deformation of the side walls of the plastic housing for fixation of the blade holder.

In the second embodiment, the razor blade unit 1 also comprises a plastic housing 2, which has a front guide strip 10, two side walls 15, a vertically upwardly extending strip 29 at the rear longitudinal side 28 that is parallel to the guide strip 10, and a blade platform 16 in the interior All of these parts are integrally formed, and thus form a molded plastic part. The underside of the plastic housing 2 is additionally provided with a looking mechanism 30 via which a non-illustrated handle can be secured to form the finished razor.

Figure 12:
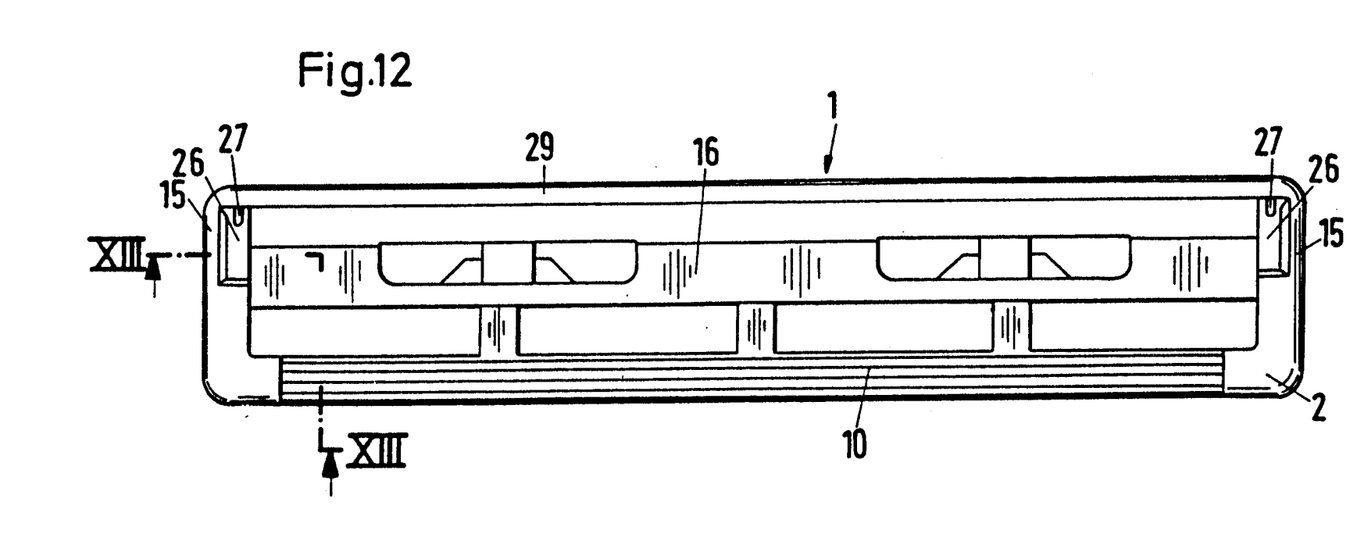
FIG. 12 is a top view of the razor blade unit of FIG. 11, but prior to the insertion of the blade holder.
Figure 13:
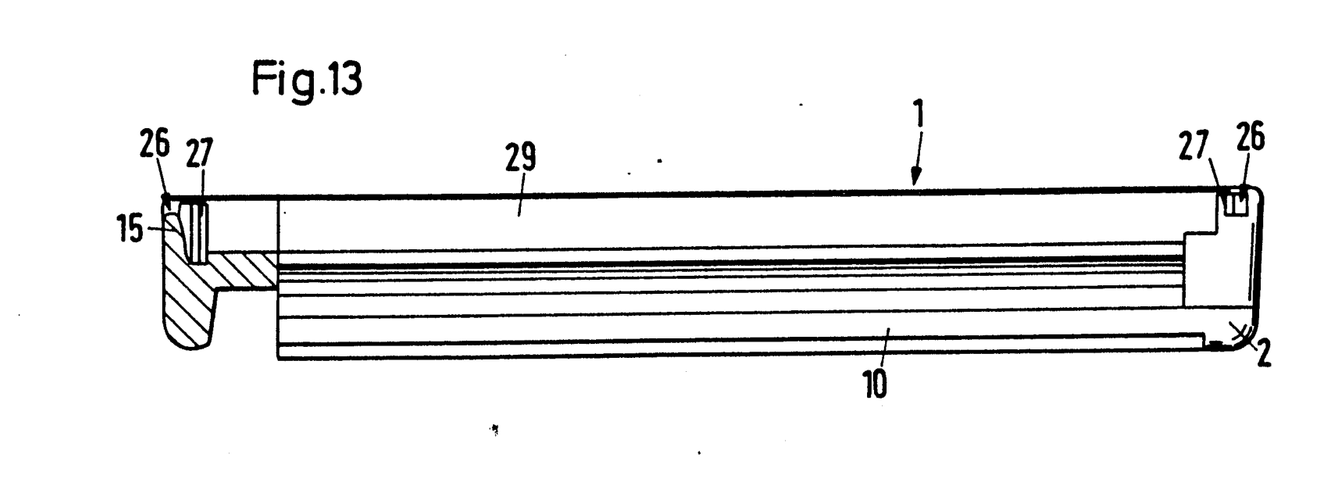
FIG. 13 is a cross-sectional view taken along the line XIII—XIII in FIG. 12.

Two razor blades 5, 5' are fixedly secured within the plastic housing 2. For this purpose, the two razor blades 5, 5' are fixedly secured to a flat elongated parallelepipedal spacer 21 in such a way that the spacer is fixed in position between the two razor blades 5, 5' in a sandwich fashion. Thus, the razor blades 5, 5' as well as the spacer 21 form a so-called blade holder 6. In this connection, if the spacer 21 is made of metal, the razor blades 5, 5' are welded thereupon, and in particularly preferably in the vicinity of the entire contact surface. Alternatively, the razor blades 5, 5' could also be glued on, so that the spacer 21 could also be made of plastic. The spacer 21 is somewhat longer than the two razor blades 5, 5', so that the spacer 21 projects slightly beyond the ends of the razor blades 5, 5'. These projecting, free ends of the spacer 21 serve for the fixation of the blade holder 6 within the plastic housing 2. In order to be able to secure the blade holder 6 within the plastic housing 2, the housing 2, in the vicinity of the side walls 15, is provided with respective recessed areas 26 that are tapered in the insertion direction. In addition, formed on the back side of each recessed area 26 is a respective rib or fin 27 that extends in the insertion direction.

Figure 14:
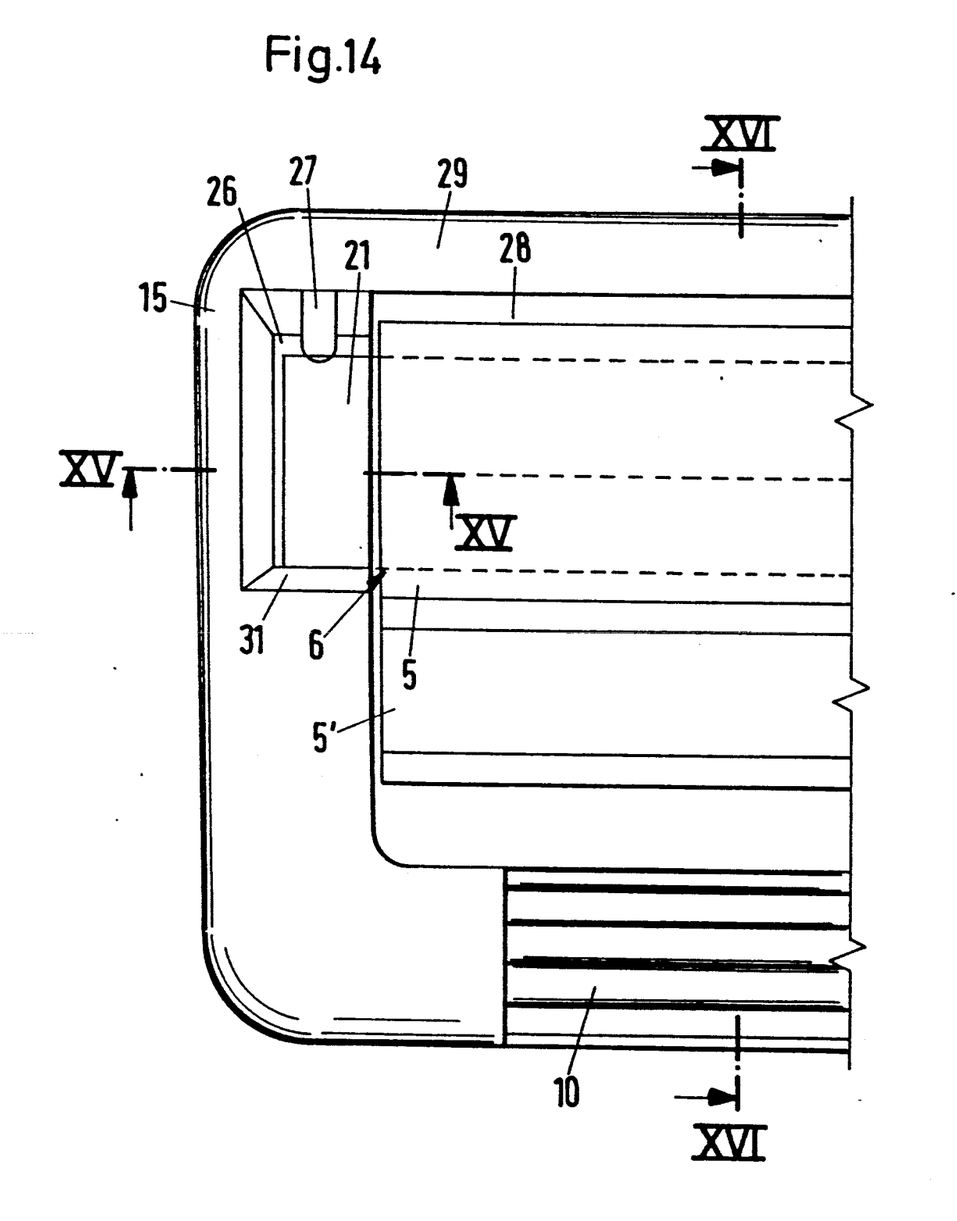
FIG. 14 is an enlarged view of a portion of FIG. 12 in the vicinity of the left side wall of the razor blade unit, but with the blade holder inserted.
Figure 15:
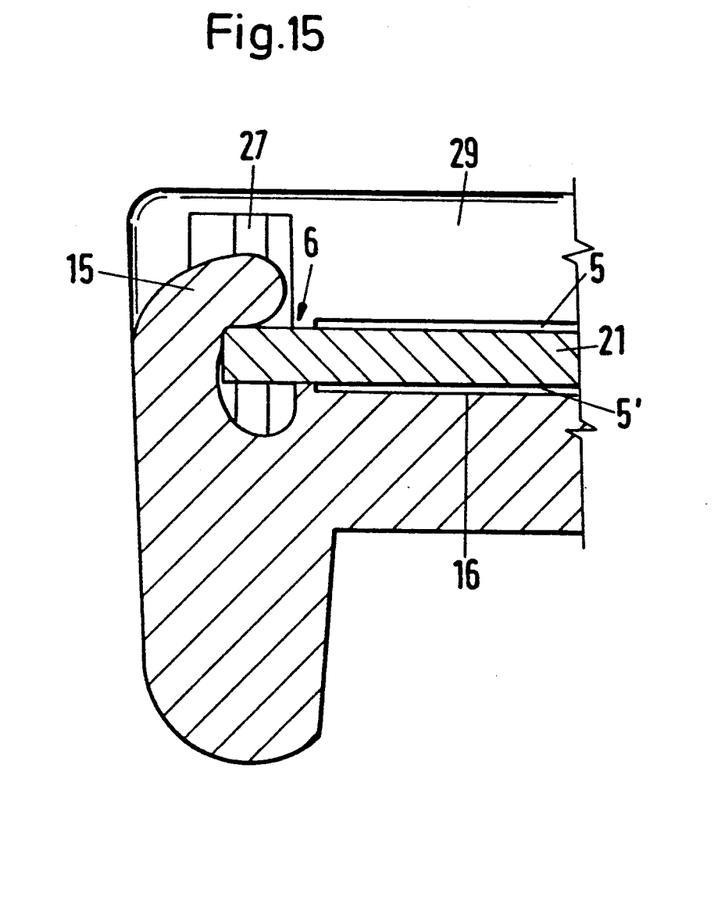
FIG. 15 is a cross-sectional view taken along the line XV—XV in FIG. 14, but with the side wall bent inwardly.

To secure the blade holder 6 within the plastic housing 2, the holder 6 is first inserted from above into the housing 2 in such a way that the free, projecting ends of the spacer 21 come to rest within the two recessed areas 26 in the side walls 15 In so doing, the fins 27 that are disposed within the recessed areas 26 press the spacer 21 towards the front, so that the spacer comes to rest against the front side 31 of the recessed area 26, as can be seen in FIG. 14. In this way, a reproducible razor geometry is achieved, with this geometry being defined by the guide strip 10 and the cutting edges of the razor blades 5, 5', and finally by the upper edge of the strip 29.

After the blade holder 6 has been placed into the plastic housing 2, in which position the blade holder 6 rests upon the blade platform 16, the final fixation is undertaken by plastically bending the side walls 15 of the plastic housing 2 inwardly in the region of the recessed areas 26 via a cold deformation or shaping, so that the deformed portion of the side wall 15 comes to rest upon the free end of the spacer 21 and fixes the blade holder 6 in position therebetween. This can be clearly seen from FIG. 15.

Figure 16:
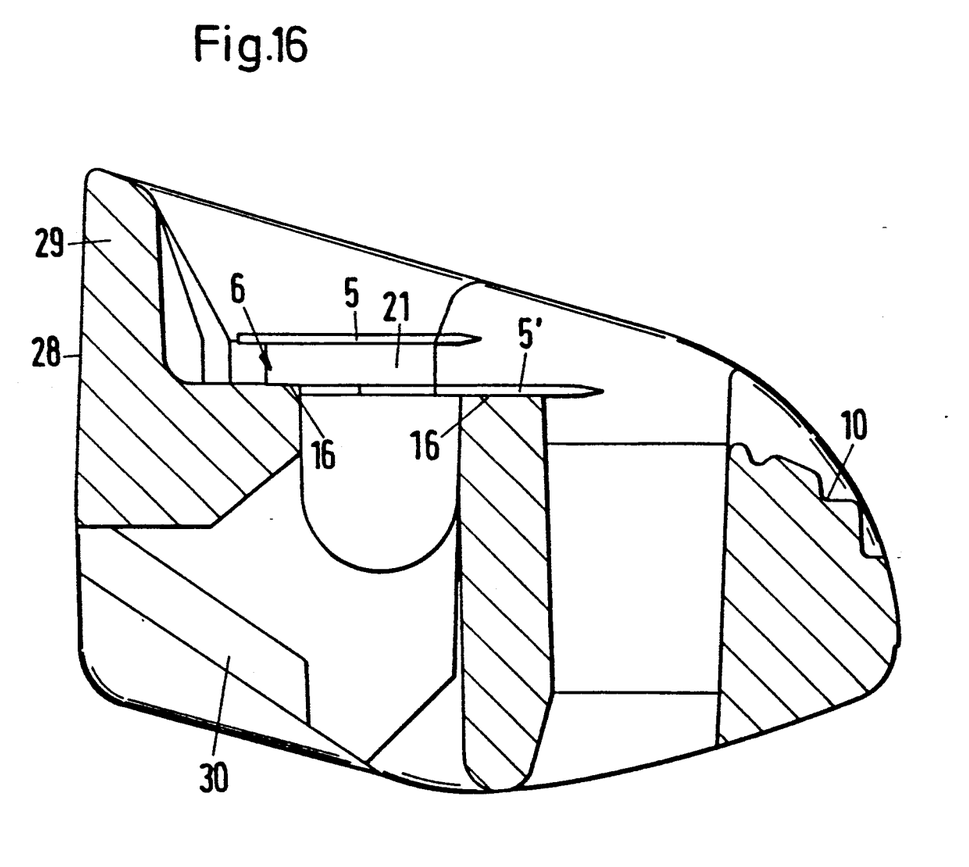
FIG. 16 is a cross-sectional view taken along the line XVI—XVI in FIG. 14.
Figure 17:
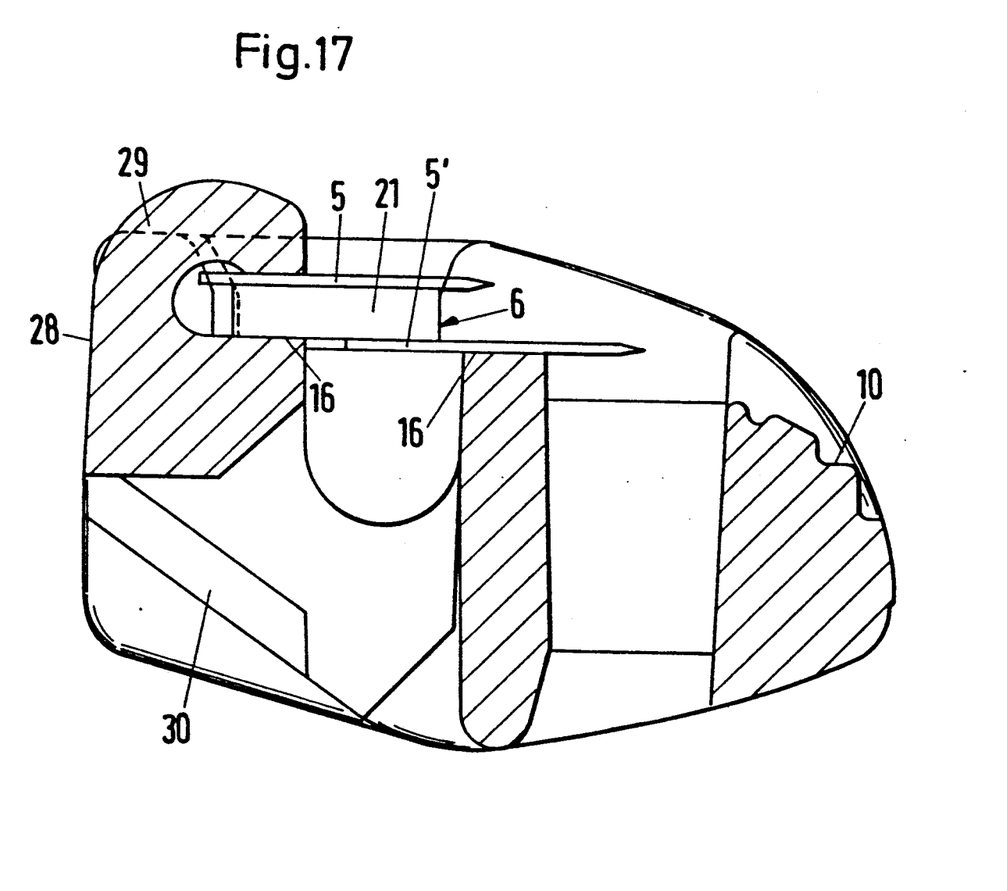
FIG. 17 is a cross-sectional view similar to that of FIG. 16, but showing an alternative type of securement for fixing the position of the blade holder within the plastic housing.

FIG. 17 finally shows an alternative means for securing the blade holder 6 within the plastic housing 2, with FIG. 17 being a cross-sectional view that is similar to that of FIG. 16. This embodiment can also be provided with recessed areas 26 in the vicinity of the side walls 15 of the plastic housing 2 for positioning the blade holder 6 when it is inserted.

Also with this embodiment, formed on the rear longitudinal side 28 of the plastic housing 2 is a strip 29 that extends essentially vertically upwardly. However, this embodiment differs from the first type of securement, where the side walls 15 are bend inwardly over the ends of the blade holder 6 in the vicinity of the recesses areas 26, in that here the initially vertically upwardly extending strip 29 is bent toward the front in such a way that it comes to rest upon the blade holder 6, thereby fixing the blade holder within the plastic housing 2. The strip 29 can either be bent over its entire length, or can also be bent only at certain portions thereof, for example at two locations. This bending of the strip 29 toward the front is sufficient to fix the position of the blade holder 6 within the plastic housing 2. The lateral recessed areas 26 in the vicinity of the side walls 15 serve merely for the introduction of the blade holder 6 into the prescribed blade geometry.

With this second embodiment of a razor blade unit 1, the blade holder 6 has a somewhat different shape than does the blade holder 6 of the first embodiment. Never the less, it is also possible to embody the blade holder 6 of the second embodiment in conformity with the blade holder 6 of the first embodiment, i.e. with an L-shaped cross-sectional profile, one leg of which defines the spacer while the other leg is received by a corresponding longitudinal slot in the lower portion of the plastic housing 2 In such a case, the only difference between the first and second embodiments would be that the blade holder 6 of the second embodiment is not fixed in the plastic housing 2 via a fixation strip 4, but rather is fixed in position by plastic deformation of the plastic housing 2.

The present invention is, of course, in no way restricted to the specific disclosure of the specification and drawings, but also encompasses any modifications within the scope of the appended claims.

What we claim is:

1. In a razor head, especially a razor blade unit of a wet safety razor, with said razor head being disposed at the front end of a handle and including a plastic housing that has a front guide strip, and with a razor blade means in the form of a single or double razor blade resting in a fixed manner on a blade platform of said housing,, the improvement wherein:

said razor blade means is fixedly secured to a spacer and forms a blade holding unit therewith, with said blade holding unit essentially being placed from above into said plastic housing and onto said blade platform thereof; and means separate from said spacer are provided for fixing said blade holding unit in said plastic housing after said blade holding unit is placed therein.

2. A razor head according to claim 1, in which said razor blade means is welded or glued to said spacer, preferably over an entire contact surface therewith.

3. A razor head according to claim 1, which includes a strip having an essentially L-shaped cross-sectional configuration with a first and second leg, with said first leg defining said spacer, and said second leg being received by a corresponding longitudinal slot in a lower portion of said plastic housing.

4. A razor head according to claim 3, in which said first and second legs of said L-shaped strip are disposed at right angles to one another.

5. A razor head according to claim 3, in which said second leg of said strip is formed by short strip elements that are fixedly interconnected by pieces, with said second legs formed by said strip elements being received in said longitudinal slot of said lower portion of said plastic housing; and in which in a direction perpendicular to cutting edge means of said razor blade means, a rear wall of said plastic housing has openings that correspond to openings between said strip elements.

6. A razor head according to claim 5, in which said openings between said strip elements are provided above said pieces that interconnect same.

7. A razor head according to claim 5, in which said strip elements are interconnected by said pieces essentially in a central portion of said second leg to thereby form a free end of each strip element remote from said first leg, with said lower portion of said plastic housing being provided with slot means for receiving said free ends of said strip elements.

8. A razor head according to claim 5, in which said blade platform is formed by support ribs that extend at right angles to said cutting edge means of said razor blade means.

9. A razor head according to claim 8, in which said support ribs are disposed in front of said strip elements.

10. A razor head according to claim 9, in which said lower portions of said plastic housing is provided with openings that are disposed between said support ribs.

11. A razor head according to claim 10, in which said guide strip, starting from an upper side thereof, is angled downwardly and toward the rear.

12. A razor head according to claim 10, in which an upper side of each of said support ribs, in the region behind said guide strip, is provided with a recessed portion.

13. A razor head according to claim 12, in which said guide strip is integral with said lower portion of said plastic housing.

14. A razor head according to claim 5, in which said blade holding unit is insertable into said lower portion of said plastic housing, which lower portion is provided with said blade platform; and in which said means for fixing said blade holding unit in said plastic housing comprises a fixation strip that defines a protective cap, with said fixation strip being disposed on and fixedly connected to said lower portion of said plastic housing such that said blade holding unit is disposed and fixed between said lower housing portion and said fixation strip.

15. A razor head according to claim 14, in which said fixation strip is provided with side pieces via which said fixation strip is secured to side walls of said lower portion of said plastic housing.

16. A razor head according to claim 14, in which said fixation strip has a rear wall via which said fixation strip is secured to a rear wall of said lower portion of said plastic housing.

17. A razor head according to claim 14, in which said fixation strip is secured to said lower portion of said plastic housing by being glued thereto, by being welded, especially ultrasonically welded, thereto, or by inserting the two parts into one another.

18. A razor head according to claim 14, in which said fixation strip, which defines said protective cap, is coated with a friction-reducing coating, especially of a photolacquer or a polymer.

19. A razor head according to claim 14, in which said fixation strip has a rear wall with openings that are aligned with openings provided in said second leg of said strip.

20. A razor head according to claim 1, in which said means for fixing said blade holding unit in said plastic housing comprise plastically deformed portions of said housing, whereby said blade holding unit is fixed in position between said deformed portions and said blade platform.

21. A razor head according to claim 20, in which said plastic housing is cold deformable.

22. A razor head according to claim 20, in which said spacer has free ends that project beyond said razor blade means, with said blade holding unit being held in place in said plastic housing in the vicinity of said free ends of said spacer.

23. A razor head according to claim 22, in which said plastic housing has two side walls, each of which is provided with an upwardly open recessed area into which said free ends of said spacer of said blade holding unit are inserted from above; and in which in the region of said recessed areas said side walls are bent inwardly over said free ends to form said deformed portions to fix said blade holding unit in said plastic housing.

24. A razor head according to claim 23, in which said recessed areas have a funnel-shaped configuration.

25. A razor head according to claim 23, in which each of said recessed areas has a rear side on which is formed a fin that extends in the direction of insertion and narrows said recessed area in said direction of insertion.

26. A razor head according to claim 20 in which said plastic housing has a rear longitudinal side on which is formed a strip that extends essentially vertically upwardly.

27. A razor head according to claim 26, in which at least portions of said strip are bent toward the front to form said deformed portions to fix said blade holding unit in said plastic housing.

* * * * *